Patented Nov. 11, 1924.

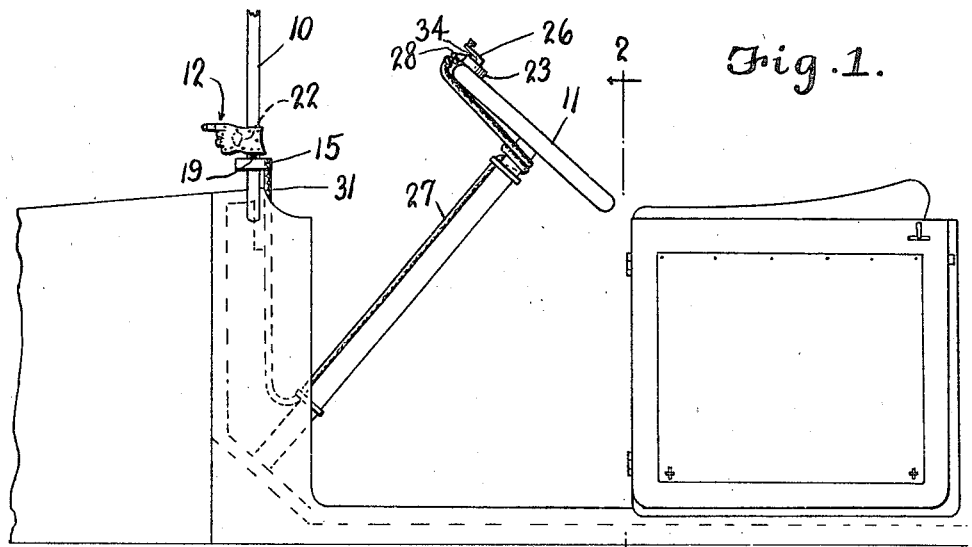
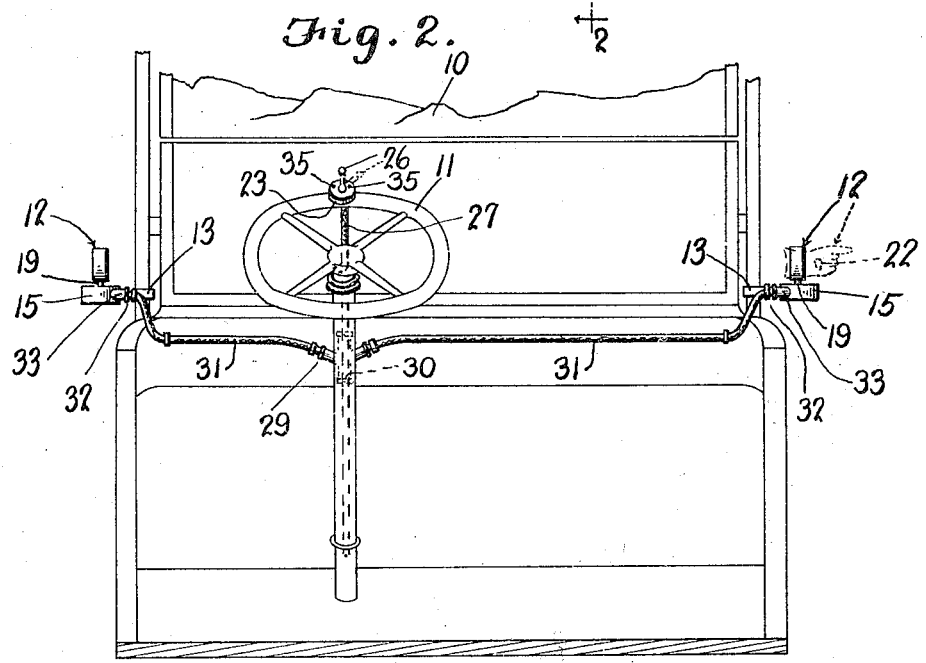

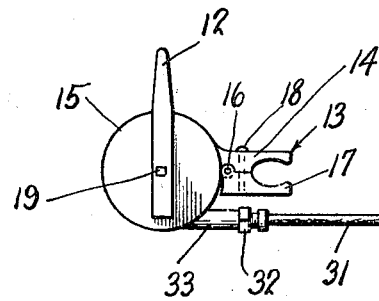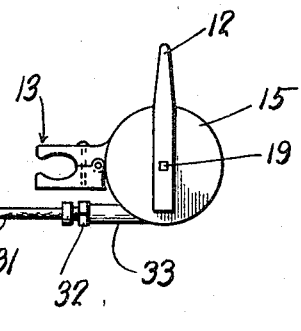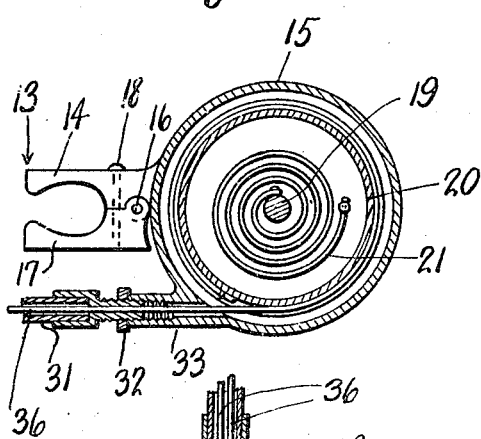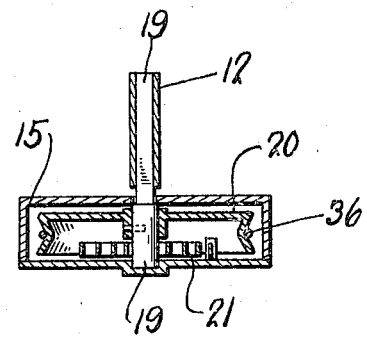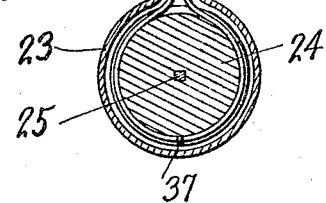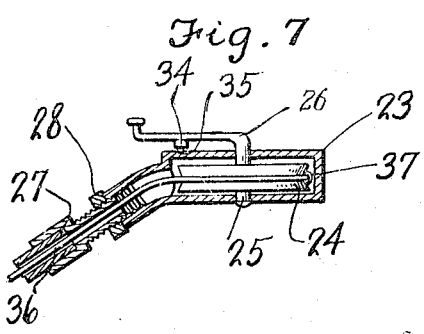

1,514,843

UNITED STATES PATENT OFFICE.

FRANK X. EWALD, OF LA SALLE, ILLINOIS.

VEHICLE SIGNAL.

Application filed February 20, 1920. Serial No. 360,050.

*To all whom it may concern:*

Be it known that I, FRANK X. EWALD, a citizen of the United States, residing at La Salle, in the county of La Salle and State of Illinois, have invented new and useful Improvements in Vehicle Signals, of which the following is a specification.

This invention relates to vehicle signals and has for an object the provision of a signal, which may be removably secured to a convenient part of a vehicle for the purpose of indicating the proposed direction of travel.

Another object is the provision of a spring actuated signal, which is normally maintained in neutral or inactive position and which may be operated by the driver of the vehicle to signal his intention to turn or stop.

Another object is the provision of a novel form of signal actuating means, in which the signals are normally held in a neutral or inactive position by the opposite action of the spring, but are moved to a signalling position through the medium of an actuating arm or lever, located within convenient reach of the driver.

With the above and other objects in view the invention further consists of the following novel features and details of construction, to be hereinafter more fully described, illustrated and claimed.

In the drawings:—

Figure 1 is a fragmentary elevation showing the invention in use.

Figure 2 is a sectional view on the line 2—2 of Figure 1.

Figure 3 is a diagrammatic view of the invention per se.

Figure 4 is an enlarged section through the signal drum.

Figure 5 is a transverse sectional view of the same.

Figure 6 is a sectional view through the actuating member.

Figure 7 is an edge view of the same showing the casing in section.

Referring more specifically to the drawings, wherein like characters of reference denote corresponding parts, the wind shield of the vehicle is indicated at 10 and the steering wheel at 11.

The signal which comprises the present invention includes a pair of signal arms 12, which are preferably made in the form of a hand and located upon each side of the vehicle windshield. They are secured to the frame at each side of the wind shield by means of clamps 13, the latter comprising arms 14, one of which is rigidly secured to each of the cylindrical casings 15. The other arm of the clamp is pivotally secured to the arm 14 as indicated at 16, so that this latter mentioned arm, which is indicated by the reference character 17, may be moved pivotally with respect to the arm 14 to tightly embrace the frame of the wind shield 10. The arm 17 may be held against movement with respect to the arm 14 through the medium of a screw 18, so that the cylindrical casing 15 may be rigidly secured in position upon the wind shield frame.

Mounted within bearings in the casing 15 is a hollow standard or post 19, the latter being capable of rotation and having secured thereto a hollow drum 20. Positioned within this drum and surrounding the post or standard 19 is a coil spring 21, having one end secured to the drum 20 and the opposite end to the casing 15, which permits of the spring being wound to place the drum 20 under tension. The post or standard 19 extends upward through the top of the casing 15 and the signal arm 12 is secured thereon, so that a movement of the drum will impart a like movement to the arm 12. If desired the signal arms may be so formed as to house a light 22 to which current may be supplied from any suitable source.

For the purpose of providing for the convenient operation of the signals by the driver of the vehicle, the steering wheel 10 has secured thereon a housing 23 and mounted for rotation in this housing is an actuating member or drum 24. This actuating member or drum is mounted upon a short axle 25, having bearings in the housing 23 and extending through said housing for connection with a crank arm 26. The housing 23 is of circular formation to accommodate the drum 24 and connected to and communicating with the housing 23 is a tubular member 27, the latter being connected with an extension of the housing 23 by means of a suitable coupling or union 28. The casing 23 is secured upon the steering wheel 11 and the tubular member 27 extends downward along the steering post for connection with a coupling member 29, the latter being preferably secured to the instrument board of the vehicle as shown in Figure 2 of the drawing. The coupling member 29 is connected to the tubular member 27 through the medium of a union 30 and connected to this coupling member through the same means are oppositely extending tubular members 31. These tubular members 27 and 31 are of flexible formation and the outer ends of the last named members are connected through the medium of unions 32, with tubular extensions 33 formed on the casing 15. By this means the actuating member may be secured to the steering wheel of the vehicle and the signal arms located at opposite sides of the wind shield and operated from the steering wheel without interfering with the movement of the latter.

In order to properly position the signal arms 12 which extend forward when in neutral or inactive position, the crank arm 26 is provided with a projection 34. This projection is adapted to enter one of a plurality of depressions 35 to hold the signal arms in their inactive position. There are preferably three of these depressions, one depression being positioned for engagement with the projection 34 when the crank arm 26 is in a position shown in Figure 2, while the additional depressions 35 are located upon opposite sides thereof. When the crank arm is in the position shown in Figure 2 the action of the springs will be neutralized, but, if for any reason either of the springs should become weaker than the other, the engagement of the projection 34 with the central depression will hold the arms in their neutral position. By moving the crank arm 26 either to the left or to the right the signal arms are moved upon their pivot against the action of the springs 21 and may be held in signalling position for any desired length of time by the engagement of the projection 34 with the proper depression.

The spring drums 20 are connected to the actuating member or drum by means of a cable 36. One end of this cable is connected to one of the drums 20 and is passed through the tubing around the actuating drum, to which it is secured as shown at 37 and the opposite end is secured to the opposite drum 20.

The invention is susceptible of various changes in its form, proportions and minor details of construction, and the right is herein reserved to make such changes as properly fall within the scope of the appended claim.

Having described the invention what is claimed is:

A traffic signal for automobiles comprising a pair of pivoted signal elements arranged upon opposite sides of the automobile, a drum fixed to each of the same, a substantially Y-shaped pipe fitting, a flexible tube leading from one pair of the branches of the pipe fitting to a point adjacent the drum, a third flexible conduit leading from the intermediate branch of the pipe fitting and extending along the steering wheel post of the automobile to a point within reach of the operator, and a flexible element passing through the conduit and engaged with the drum, and manually operable means arranged at the upper end of the third conduit for operating the flexible element whereby to rotate the drum, and means normally urging the drum to normal position.

In testimony whereof I affix my signature.

FRANK X. EWALD.